April 16, 1968  A. J. D. STRAUS ET AL  3,378,097
TRANSDUCER ROTATING MECHANISM FOR BOREHOLE LOGGING TOOLS
Filed Sept. 8, 1966  2 Sheets-Sheet 2

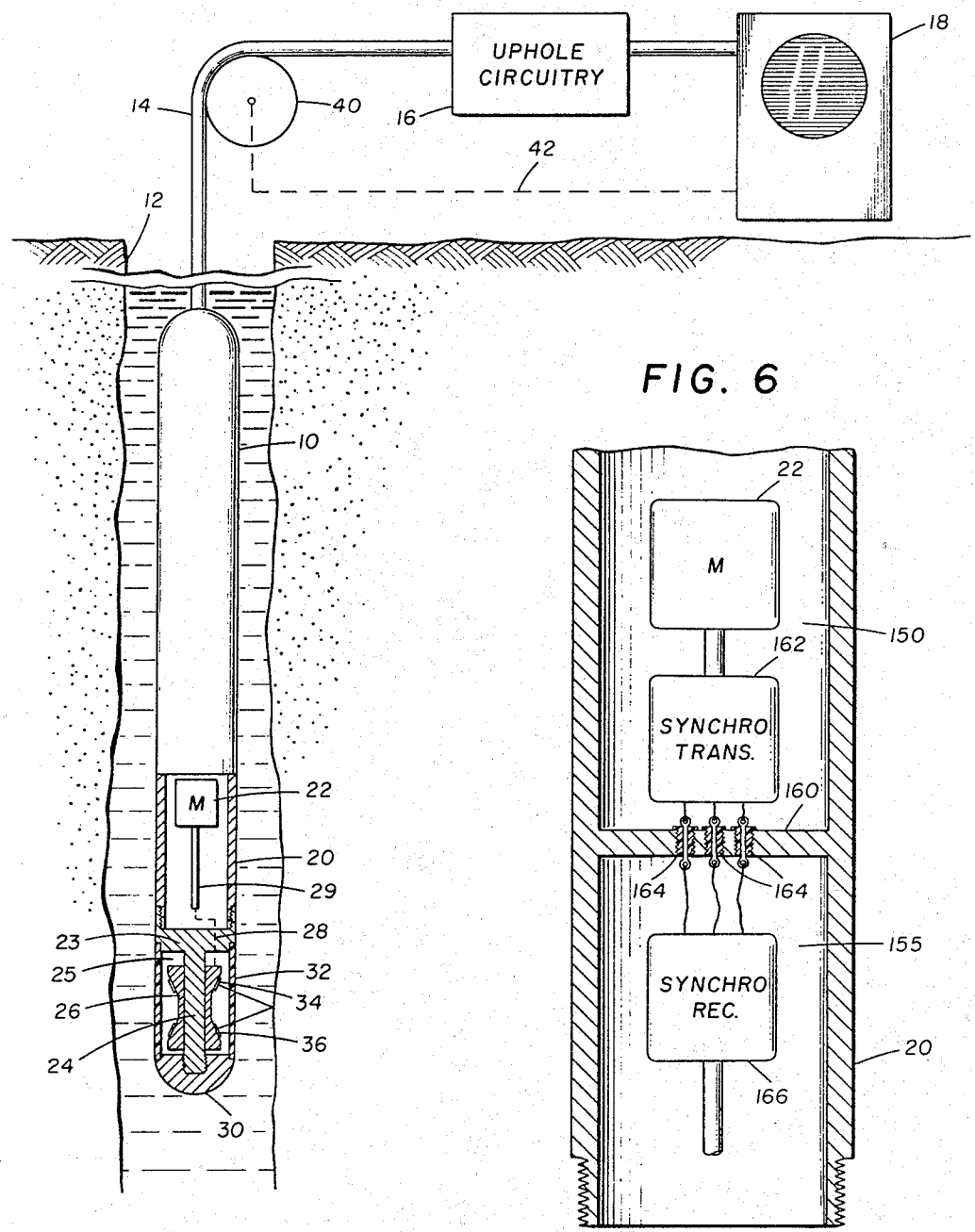

3,378,097
TRANSDUCER ROTATING MECHANISM FOR BOREHOLE LOGGING TOOLS

Andrew J. D. Straus and Joseph Zemanek, Jr., Dallas, Tex., assignors to Mobil Oil Corporation, a corporation of New York
Filed Sept. 8, 1966, Ser. No. 577,928
8 Claims. (Cl. 181—.5)

This invention relates to the art of logging earth boreholes to obtain information about the formations adjacent the borehole, and more particularly to a mechanism for rotating, in a logging tool, a radiant energy transducer through a 360-degree scan of the borehole wall, unobstructed by portions of the logging tool, while at the same time providing means for protecting the transducer from impact injury.

In the logging of boreholes with nuclear energy, acoustic energy, light energy, or other types of radiant energy, it is sometimes desirable to rotate a transducer about a logging tool to scan the borehole wall through 360 degrees in a plane substantially perpendicular to the longitudinal axis of the borehole. The prior art has provided two primary types of transducer rotating mechanisms. In one type, the transducer assembly hung freely at the end of a logging tool as the assembly rotated through a 360-degree scan. While the transducer assembly did have an unobstructed view, it was susceptible to injury. It was likely that the assembly would be damaged if it were bumped against the bottom of the borehole or against any obstructions in the borehole. In the other type, a guard cap was suspended below the transducer assembly by supporting members from the upper part of the logging tool. The guard protected the transducer assembly from injury from below, but the supporting members obstructed the view of the transducer assembly as it rotated through 360 degrees. Almost any type of rigid member supporting a guard from outside the transducer assembly caused either attenuation of the radiant energy or echoes that interfered with the signals being received by the transducer assembly.

Therefore, it is the primary object of the present invention to provide a mechanism for rotating a radiant energy transducer through a 360-degree scan of the borehole wall unobstructed by parts of the logging tool, and yet at the same time provide a guard member to protect the transducer assembly from impact injury.

Broadly, the present invention provides a transducer rotating mechanism for use in an elongated, borehole logging tool having an upper part and a lower part. A rigid member with an overall diameter smaller than that of the logging tool is connected between the upper part and the lower part. A radiant energy transducer assembly is mounted for rotation about rigid member. A driving means in the logging tool rotates the transducer assembly through a 360-degree scan unobstructed by portions of the logging tool.

A more specific embodiment of the present invention envisions a transducer rotating mechanism for use in an elongated, borehole logging tool having a transducer compartment separated from a prime mover compartment by a bulkhead. The mechanism comprises a rigid member attached to the bulkhead and extending into the transducer compartment. The rigid member has an overall diameter less than that of the logging tool. A radiant energy transducer assembly is mounted for rotation about the rigid member in the transducer compartment. A rigid nose piece is attached to the rigid member to protect the transducer assembly from impact injury. A device, which includes a circumferential port which is substantially transparent to the radiant energy, surrounds the transducer assembly between the nose piece and the logging tool and forms a fluid-tight seal for the transducer compartment. Driving means in the logging tool rotates the transducer assembly about the rigid member through a 360-degree scan without substantial attenuation of the radiant energy by the logging tool.

In a still more specific embodiment of the present invention, the rigid member comprises a solid rod. The driving means comprises a first spur gear encircling the rigid member and attached to the transducer assembly. A shaft which is rotatably mounted extends from one end adjacent the transducer assembly through the bulkhead to its other end in the prime mover compartment. A second spur gear is attached to one end of the shaft and meshes with the first spur gear. A prime mover which is mounted in the prime mover compartment is coupled to the other end of the shaft whereby the transducer assembly is rotated.

There will now be described the details of a specific embodiment of the invention with reference to the accompanying drawings in which:

FIGURE 1 is a schematic illustration partly in section of the invention used in an acoustic logging system;

FIGURE 6 is a diagrammatic illustration of a modification of the invention for the driving prime mover.

Figure 5:
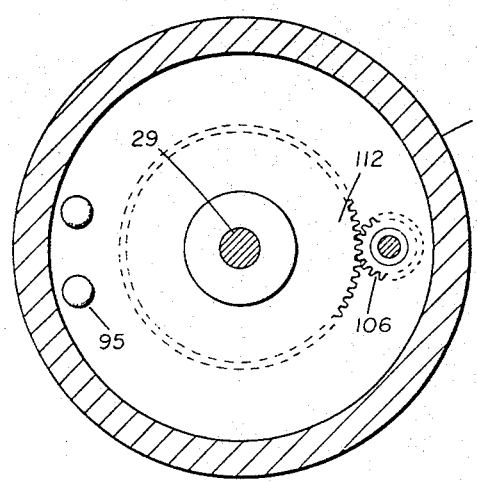
FIGURE 5 is a sectional view taken along lines 5—5 in FIGURE 2.

Referring now to FIGURE 1, there is illustrated the use of the present invention in an acoustic logging system for producing a facsimile of the wall of a borehole. The downhole portion of the system includes a tubular logging tool 10 lowered into a mud filled borehole 12 by a logging cable 14. The uphole portion of the system includes uphole circuitry 16 and a cathode ray oscilloscope 18 where a facsimile of the wall of the borehole is depicted upon its face.

The lower portion of logging tool 10 is shown partially cut away to illustrate the transducer rotating mechanism of the present invention. At the lower end of logging tool 10 is a motor compartment 20 formed by a tubular housing or barrel. An electric motor 22 is mounted in compartment 20. The motor compartment 20 is separated from a transducer compartment 25 by a bulkhead 23. A rigid member or mandrel 24 is attached to bulkhead 23 and extends into transducer compartment 25. An acoustic transducer assembly 26 is mounted for concentric rotation about mandrel 24. A gear train, represented by dashed line 28, links the driving shaft 29 of motor 22 to the transducer assembly 26 so that the transducer assembly is rotated about mandrel 24. Attached to the lower end of mandrel 24 is a rigid nose piece 30. A device 32 surrounds transducer assembly 26 between nose piece 30 and bulkhead 23 and forms a fluid-tight seal for transducer compartment 25. Device 32 includes a circumferential port which is substantially transparent to acoustic energy.

As the transducer assembly 26 is rotated about mandrel 24, it is protected from impact injury. If the logging tool 10 is accidentally bumped against the bottom of borehole 12 or if an obstruction is encountered in the borehole, the rigid nose piece 30 acts as a shield from any impact injury from below the transducer assembly 26. The transducer assembly 26 is recessed inside the transducer compartment 25 so that it is protected from impact injury from the sides.

Now in operation of the logging system of FIGURE 1, the logging tool 10 is lowered into the bottom of borehole 12. Motor 22 begins driving transducer assembly 26 for rotation about the mandrel 24. A transmitting transducer 34 is excited to generate pulses of acoustic energy in a confined, narrow beam toward the walls of borehole 12. The pulses reflected from the walls of the borehole are picked up by a receiving transducer 36 and converted to representative electrical pulses. These electrical pulses are amplified and detected in logging tool 10 and then transmitted uphole via the electrical conductors in the logging cable 14. Uphole circuitry 16 receives the electrical pulses appearing uphole and operates to intensity modulate the beam of a cathode ray oscilloscope 18. Means in the logging tool 10, not shown, operates to transmit a position signal uphole representative of the angular position of the transducer assembly 26. This position signal operates to sweep the oscilloscope beam horizontally across the face of oscilloscope 18 in proportion to the angular position of transducer assembly 26.

As the logging tool 10 is withdrawn from the borehole 12 during a logging run, a measuring sheave 40 is rotated by the logging cable 14. An electromechanical link 42 connected between measuring sheave 40 and oscilloscope 18 controls the sweep of the oscilloscope beam vertically down the face of the scope.

Thus, as the logging tool 10 is drawn along the length of the borehole and the transducer assembly 26 is rotated through a 360-degree scan of the borehole, a facsimile is produced on the face of the oscilloscope 18 in correlation with the depth of logging tool 10. Whenever the beam generated by transmitting transducer 34 encounters an anomaly in the borehole wall, such as a crack or split, the acoustic pulses are defracted away and are not received directly by the receiving transducer 36. When some of the succession of generated pulses are not reflected back to receiving transducer 36, the uphole circuitry 16 does not receive an electrical pulse to intensity modulate the beam of oscilloscope 18 and a gap is indicated on the face of the oscilloscope.

Figure 2:
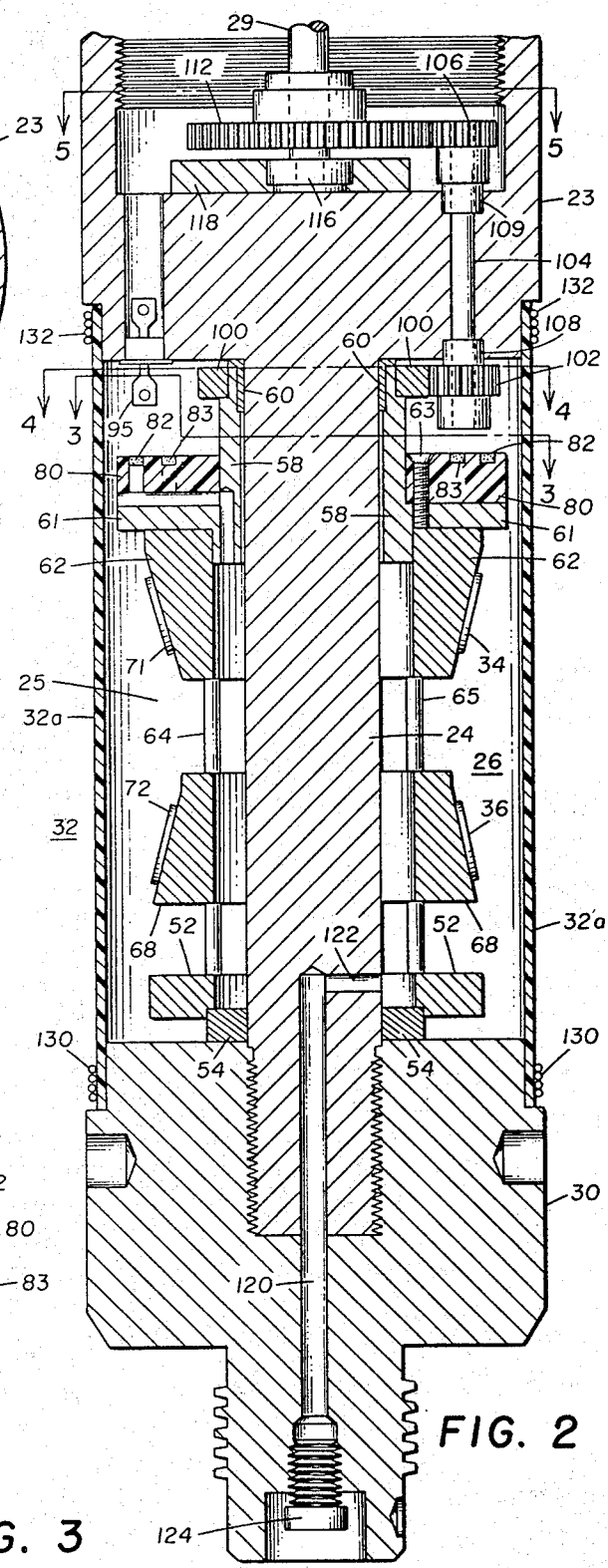
FIGURE 2 is an enlarged and more detailed sectional view of the transducer rotating mechanism of FIGURE 1.

An enlarged and more detailed sectional view of the transducer rotating mechanism of the present invention is illustrated in FIGURE 2. Bulkhead 23 has threads for screwing into the lower end of compartment 20 (FIGURE 1). Bulkhead 23 is turned down at its lower end to form a solid rod or mandrel 24. Rod 24 may be constructed of a separate material from bulkhead 23 and screwed into its base. While it is preferred that the mandrel 24 be a solid rod, it can alternatively be any rigid member or structure which connects centrally the bulkhead 23 to the nose piece 30.

The transducer assembly 26 is mounted on bearing surfaces for concentric rotation about the mandrel 24. The lower end of the transducer assembly 26 is affixed to a lower supporting ring 52 which is mounted on bearing 54. The upper end of the tranducer assembly 26 is affixed to an upper supporting ring 58 which is mounted on a bearing surface 60. Upper supporting ring 58 includes an annular shoulder 61. Mounted flush on the underside of the shoulder 61 is an upper transducer mounting ring 62. Mounting ring 62 is held with a press fit around ring 58.

The upper transducer mounting ring 62 is linked to the lower supporting ring 52 by a number of rods, two of which are shown at 64 and 65. Rods 64 and 65 are screwed into upper supporting ring 62 and held by set screws in lower supporting ring 52.

Supported on rods 64 and 65 is a lower transducer mounting ring 68. Ring 68 is held by set screws at any desired position along rods 64 and 65.

The mounting rings 62 and 68 are cylindrical except for the flat surfaces where the transducers are mounted. More specifically, transmitting transducer 34 is mounted on a flat surface of the upper ring 62 and receiving transducer 36 is mounted on a flat surface of lower ring 68. Transducers 34 and 36 may be discs of lead zirconate titanate material glued to the flat surfaces of rings 62 and 68.

Transducers 34 and 36 are inclined at an angle with respect to each other to provide a scanning acoustic beam focused at a fixed distance from the transducers. When the logging tool is dismantled, the focal distance of the transducers may be easily changed by moving the lower mounting ring 68 to a different spacing along rods 64 and 65.

An alternate pair of transducers 71 and 72 are provided on opposite faces of mounting rings 62 and 68. Transducers 71 and 72 are inclined at a different angle with respect to each other than were transducers 34 and 36 so as to provide a different focal distance. Either pair of transducers may be used for different focal distances. Ordinarily, only a single pair is used at any one time.

While a pair of transducers has been illustrated for use as a separate transmitter and receiver, it is obvious that a single transducer can be used as a transceiver.

Figure 3:
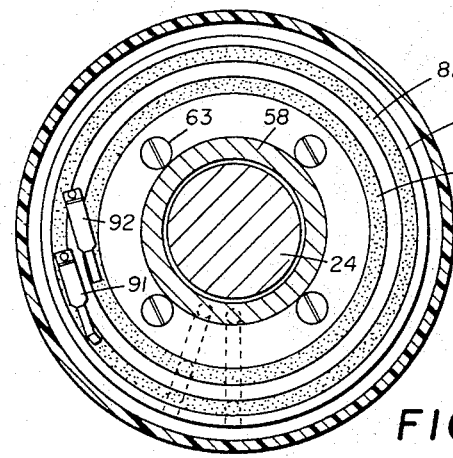
FIGURE 3 is a sectional view taken along line 3—3 of FIGURE 2.

The electrical signals produced by the transducers 34 and 36 are transmitted to the electronic instrumentation in the upper part of the logging tool through a slip ring assembly illustrated in FIGURES 2 and 3. The slip ring assembly includes an insulator ring 80 which rests on the upper surface of shoulder 61 and is firmly attached to it by a series of screws, one of which is shown at 63. Embedded in grooves of insulator ring 80 are a pair of sterling silver slip rings 82 and 83. The electrical leads from the transducers 34 and 36 are connected to the slip rings 82 and 83.

A pair of thin leaf brushes 91 and 92 ride respectively on conductor rings 82 and 83. Brushes 91 and 92 have flexible upper portions which are attached to separate feedthrough terminals in bulkhead 23, one of which is shown at 95. The electrical leads for transducers 34 and 36 are connected to the feedthrough terminals and thence to the upper part of the logging tool where they are connected to well-known electronic instrumentation provided for logging systems having rotating radiant energy transducers.

Figure 4:
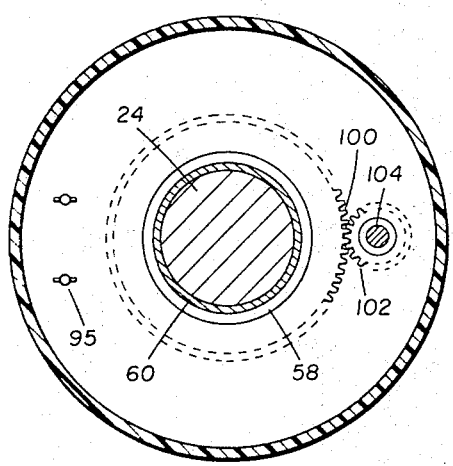
FIGURE 4 is a sectional view taken along lines 4—4 in FIGURE 2.

Referring now to FIGURES 2, 4, and 5, there is illustrated the gear train which links the rotating shaft 29 of the electric motor 22 (FIGURE 1) to the transducer assembly 26. A first spur gear 100 is mounted concentrically around mandrel 24 and is secured to the upper supporting ring 58. Gear 100 meshes with a second spur gear 102 which is connected at the lower end of a shaft 104. A third spur gear 106 is connected at the upper end of shaft 104. Shaft 104 is mounted for free rotation on bearings 108 and 109. Gear 106 meshes with a fourth spur gear 112 which is connected to the lower end of the driving shaft 29 rotated by the electric motor 22. The end of shaft 29 is mounted in a bearing 116 positioned in a base ring 118.

Now in summary, the electric motor 22 (FIGURE 1) rotates shaft 29 and spur gear 112. Spur gear 112 drives spur gear 106 which rotates the shaft 104 and thus turns spur gear 102. Spur gear 102 drives spur gear 100 which is attached to transducer assembly 26 to thus rotate the transducer assembly about the mandrel 24. As the transducer assembly rotates about the mandrel 24, brushes 91 and 92 ride on conductor rings 82 and 83 to transfer the electrical signals from transducers 34 and 36. Means (not shown) in the upper part of the logging tool excites the transmitter transducer 34 with electrical voltage pulses which cause it to emit acoustic pulses confined in a narrow beam directed toward the wall of the borehole. Also as transducer assembly 26 rotates, the receiving transducer 36 picks up the reflections of the transmitted acoustic pulse and converts them into representative electrical pulses which are transmitted to the electronic instrumentation in the upper part of the logging tool and thence uphole.

The transducer assembly 26 is protected from impact injury from below the logging tool by rigid nose piece 30. Nose piece 30 has threads at its lower end for the attachment of a conventional centralizer assembly. The nose piece 30 is preferably screwed onto threads on the lower end of rod 24 so that it may be easily connected and disconnected from the rod 24.

Transducer compartment 25 is filled with a light oil to provide acoustical coupling between transducers 34 and 36 and the borehole mud. To permit filling of compartment 25 with oil, nose piece 30 is provided with a central bore 120 extending upward into the rod 24 with an outward passage 122 extending into compartment 25. The bore 120 is closed by a plug 124.

The device 32, surrounding the transducer assembly 26 between bulkhead 23 and nose piece 30, forms a fluid-tight seal for compartment 25 to retain the light oil and to exclude the borehole mud. Device 32 also protects the transducer assembly 26 from impact injury. Preferably, device 32 includes a thin sleeve 32a which is substantially transparent to acoustic energy and is secured at each end by clamps 130 and 132. Sleeve 32a may be a flexible, neoprene material such as available from Immel Engineering Co., Dallas, Tex. In other embodiments, device 32 may be a hard, acoustically opaque material with only a circumferential port which is transparent to the acoustic energy transmitted and received by assembly 26.

One of the biggest problems in designing a rotating mechanism for a borehole logging tool is to provide adequate sealing around a mechanical rotating shaft. The pressure in the borehole may be on the order of 15,000 pounds per square inch while the pressure inside the logging tool is atmospheric. In the preferred embodiment of the rotating mechanism, the problem of sealing a rotating shaft against borehole pressure is avoided. All of the mechanical rotating mechanisms including the motor 22 are subjected to borehole pressure. The space inside sleeve 32 and barrel 20 is filled with a light oil. Motor 22 is one designed to operate at borehole pressure. In one embodiment, it was a Model No. 83A563-20 available from Globe Industries, Dayton, Ohio. The electrical power to motor 22 as well as the electrical leads for the transmitting and receiving transducers is transmitted to the upper part of the logging tool through electrical feedthrough terminals screwed into a bulkhead (not shown) separating the motor compartment 20 and the upper part of logging tool 10. The electrical feedthrough terminals and the bulkhead absorb all the pressure differential.

Where design considerations dictate a motor operating at atmospheric pressure, an alternate embodiment of the driving means for rotating the transducer assembly 26 is illustrated in FIGURE 6. Motor 22 is now located in a separate compartment 150. Compartment 150 is at atmospheric pressure as is the rest of the logging tool 10. Compartment 150 is separated from the lower compartment 155 by bulkhead 160.

Motor 22 now rotates a synchro transmitter 162. The electrical leads from synchro transmitter 162 are applied through feedthrough terminals 164 screwed into the bulkhead 160 to the input of a synchro receiver 166. The output shaft of synchro receiver 166 rotates to a position determined by the input shaft of the synchro transmitter 162. Thus the synchro receiver 166 is at borehole pressure but is driven to a position determined by the motor 22 located in compartment 150 at atmospheric pressure.

Now that the invention has been completely described and illustrated, it will become apparent to those skilled in the art that certain modifications can be made. It is intended to cover all such modifications as fall within the scope of the appended claims.

The invention claimed is:

1. A transducer rotating mechanism for use in an elongated, borehole logging tool having an upper part and a lower part, comprising:
   (a) a rigid member connecting said upper part and said lower part, said rigid member being smaller in overall diameter than the overall diameter of said logging tool,
   (b) a radiant energy transducer assembly mounted for rotation about said rigid member, and
   (c) driving means in said logging tool for rotating said transducer assembly through a 360-degree scan without substantial attenuation of said radiant energy by said logging tool.

2. A transducer rotating mechanism as in claim 1, further comprising:
   a device surrounding said transducer assembly between said upper part and said lower part and forming a fluid-tight seal therebetween said device including a circumferential port which is substantially transparent to said radiant energy.

3. In an elongated, borehole logging tool having a transducer compartment separated from a prime mover compartment by a bulkhead, a transducer rotating mechanism comprising:
   (a) a rigid member attached to said bulkhead and extending into said transducer compartment, said rigid member being of smaller overall diameter than the overall diameter of said logging tool,
   (b) a radiant energy transducer assembly mounted for rotation about said rigid member in said transducer compartment,
   (c) a rigid nose piece attached to said rigid member to protect said transducer assembly from impact injury,
   (d) a device surrounding said transducer assembly between said nose piece and said bulkhead and forming a fluid-tight seal for said transducer compartment, said device including a circumferential port which is substantially transparent to said radiant energy, and
   (e) driving means, including a prime mover mounted in said prime mover compartment, for rotating said transducer assembly about said rigid member through a 360-degree scan without substantial attenuation of said radiant energy by said logging tool.

4. A transducer rotating mechanism as in claim 3 wherein said driving means comprises:
   (1) a first spur gear encircling said rigid member and attached to said transducer assembly,
   (2) a shaft rotatably mounted and extending from one end adjacent said transducer assembly through said bulkhead to the other end in said prime mover compartment, said other end being coupled to said prime mover, and
   (3) a second spur gear attached to said one end of said shaft and meshing with said first spur gear.

5. A transducer rotating mechanism as in claim 3 wherein said rigid member comprises a solid rod.

6. A transducer rotating mechanism as in claim 3 wherein said rigid nose piece has an outside diameter at least as large as the outside diameter of said logging tool.

7. In a tubular, borehole logging tool having a motor compartment formed by a barrel separated by a bulkhead from a transducer compartment, a transducer rotating mechanism comprising:
   (a) an electric motor mounted in said motor compartment and having a driving shaft,
   (b) a rod attached to said bulkhead and extending axially downward into said transducer compartment, said rod being of smaller diameter than the outside diameter of said logging tool.
   (c) an acoustic transducer assembly mounted for concentric rotation about said rod within said transducer compartment, said transducer assembly having an overall diameter less than said logging tool,
   (d) a gear train linking said driving shaft and said transducer assembly so that said transducer assembly is rotated about said rod,
   (e) a rigid nose piece attached to the lower end of said rod below said transducer assembly, said nose piece having a diameter at least as large as said barrel so that said nose piece protects said transducer assembly from impact injury, and
(f) a thin sleeve surrounding said transducer assembly between said nose piece and said barrel and forming a fluid-tight seal for said transducer compartment, said sleeve being substantially transparent to acoustic energy.

8. A transducer rotating mechanism as in claim 7 wherein said driving shaft is mounted axially in said motor compartment and wherein said gear train comprises:
(1) a first spur gear mounted concentrically about said rod and attached to the upper end of said transducer assembly,
(2) a shaft rotatably mounted parallel to and to one side of said rod, said shaft extending from a lower end adjacent the upper end of said transducer assembly through said bulkhead to an upper end in said transducer compartment,
(3) a second spur gear attached to said lower end of said shaft and meshing with said first spur gear,
(4) a third spur gear attached to said upper end of said shaft, and
(5) a fourth spur gear attached to said driving shaft and meshing with said third spur gear whereby said transducer assembly is rotated about said rod.

References Cited

UNITED STATES PATENTS

| | | | |
|---|---|---|---|
| 2,595,241 | 5/1952 | Goble | 340—18 X |
| 2,631,270 | 3/1953 | Goble | 340—18 X |
| 2,648,056 | 8/1953 | Jakosky | 340—18 |
| 2,825,044 | 2/1958 | Peterson | 340—18 |
| 2,825,884 | 3/1958 | Fryklund. | |
| 2,865,014 | 12/1958 | Malm. | |

BENJAMIN A. BORCHELT, *Primary Examiner.*

R. M. SKOLNIK, *Assistant Examiner.*